(12) United States Patent
Nishii et al.

(10) Patent No.: US 6,550,245 B2
(45) Date of Patent: Apr. 22, 2003

(54) HYDRAULIC BRAKE APPARATUS FOR A VEHICLE

(75) Inventors: Michiharu Nishii, Toyota (JP); Takashi Kurokawa, Nagoya (JP); Satoshi Ishida, Chiryu (JP); Masaki Oishi, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 32 days.

(21) Appl. No.: 09/893,402

(22) Filed: Jun. 29, 2001

(65) Prior Publication Data

US 2002/0017820 A1 Feb. 14, 2002

(30) Foreign Application Priority Data

Jun. 30, 2000 (JP) ......................................... 2000-197969

(51) Int. Cl.$^7$ .......................... B60T 13/135; F15B 7/08
(52) U.S. Cl. ........................................... 60/553; 60/579
(58) Field of Search .................... 60/552, 553, 554, 60/579; 90/369.2, 369.3

(56) References Cited

U.S. PATENT DOCUMENTS 4,566,275 A    1/1986  Farr
5,029,951 A    7/1991  Nishii

FOREIGN PATENT DOCUMENTS

| JP | 58-71249 A | 4/1983 |
|----|-----------|--------|
| JP | 2-95966 A | 4/1990 |
| JP | 7-108920 A | 4/1995 |

*Primary Examiner*—F. Daniel Lopez
(74) *Attorney, Agent, or Firm*—Burns, Doane, Swecker & Mathis, LLP

(57) ABSTRACT

A vehicle hydraulic brake apparatus includes a brake member, a master cylinder generating brake hydraulic pressure, and a master piston movable in response to operation of the brake member. A closed chamber is defined by the master piston and a power piston is disposed behind the master piston. A power chamber is defined by the power piston rearwardly of the power piston. An auxiliary hydraulic pressure source generates power hydraulic pressure and a pressure regulating device regulates the output power hydraulic pressure and feeds it to the power chamber. A reaction force member is disposed in a front end portion of the power piston and is exposed towards the closed chamber. A retaining device maintains the reaction force member exposed towards the closed chamber, with the rearward reaction force of the master piston being transmitted to a front end portion of the power piston while bypassing the reaction force member.

13 Claims, 8 Drawing Sheets

HYDRAULIC BRAKE APPARATUS FOR A VEHICLE

This application is based on and claims priority under 35 U.S.C. §119 with respect to Japanese Patent Application No. 2000-197969, filed on Jun. 30, 2000, the entire content of which is incorporated herein by reference.

FIELD OF THE INVENTION

This invention generally relates to a hydraulic brake apparatus that feeds hydraulic brake pressure to wheel cylinders provided on respective wheels of an automobile. More particularly, the present invention pertains to a vehicle hydraulic brake apparatus provided with a master cylinder section, an auxiliary hydraulic pressure source and a pressure regulating device.

BACKGROUND OF THE INVENTION

A known hydraulic brake apparatus for an automobile is disclosed in U.S. Pat. No. 5,029,951 (corresponding to a Japanese Patent Application published as Toku-Kai-Hei 2 (1990)-95966). This known hydraulic brake apparatus is provided with a hydraulic pressure booster for assisting activation of the master cylinder in response to the brake pedal depression by using the output hydraulic pressure supplied from a power hydraulic pressure source (the auxiliary pressure source) as an assisting power source. The hydraulic brake apparatus also includes a power piston and the master cylinder possessing diameters that are different from each other, and a closed chamber hydraulically connecting the power piston to the master cylinder. According to the above structure, the brake pedal stroke can be minimized. Further, the master cylinder ran be activated directly by the brake pedal when the hydraulic pressure booster is unable to generate a sufficient assisting pressure force.

The hydraulic pressure booster also includes a one-way valve disposed between the power chamber of the hydraulic pressure booster and the closed chamber. When the hydraulic pressure booster is unable to generate sufficient assisting pressure force, the power piston can be operatively connected to the master piston. A check valve and a cup-like sealing member function as the one-way valve.

Known hydraulic brake apparatus are provided with an assisting apparatus (booster), a reaction force member is provided for attaining a so-called jumping characteristic and a wide range servo ratio. For example, as described in U.S. Pat. No. 4,566,275 (corresponding to a Japanese Patent Application published as Toku-Kai-Sho 58 (1983)-71249), a rubber block is provided with the hydraulic pressure booster as the reaction member. Hydraulic pressure applied to the master cylinder is transmitted to the rubber block as a reaction force via an output member and another element. Accordingly, the rubber block is deformed relative to a thrust portion of the booster.

As described in a Japanese Patent Application published as Toku-Kai-Hei 7 (1995)-108920, a reaction force disc is compressed and deformed under the brake operated condition. The reaction force disc may deform into a clearance defined between a reaction force rod and a guiding hole that slidably receives the reaction force rod. The surface of the reaction force disc may thus be damaged. Therefore, a brake reaction force transmitting apparatus is disclosed for preventing the reaction force disc from entering into the clearance between the reaction rod and the guiding hole and for maintaining a stable reaction force transmitting performance.

More specifically, the brake reaction force transmitting apparatus is provided with the reaction force disc and the reaction force rod. The reaction force disc is formed of an elastic member which is disposed in the hydraulic brake booster and is arranged adjacent to the master cylinder. The reaction force disc urges the master cylinder to be activated in response to the operation of the brake operating member. The reaction force rod is slidably received in the guiding hole defined in the hydraulic brake booster and arranged adjacent to the brake operating member. The reaction force transmitting apparatus serves to transmit the brake reaction force to the brake operating member via the reaction force disc and the reaction force rod. The reaction force transmitting apparatus is provided with a resin member at an end portion of the reaction force rod facing the reaction force disc. Therefore, the resin member is slidably received in the guiding hole as well as the reaction force rod.

In the hydraulic brake apparatus described in the aforementioned U.S. Pat. No. 5,029,951, a large diameter power piston is hydraulically connected to a small diameter master piston via the closed chamber. However, the reaction force member is not disposed between the power piston and the master piston.

In the aforementioned U.S. Pat. No. 4,566,275 and the Japanese Patent Applications published as Toku-Kai-Hei 7 (1995)-108920, the rubber block and the reaction force disc are disclosed as the reaction force member. The front end surface of the rubber block and the reaction force disc is operatively in contact with the rod, wherein a force is always applied to the reaction force member. Therefore, the rubber reaction force members may deteriorate. Particularly when the rubber made reaction force members, including the block and the reaction force disc, are provided for the hydraulic pressure booster, it is preferable that the reaction force member be disposed in a large diameter portion for maintaining durability. In such a situation, the overall hydraulic pressure apparatus must be enlarged.

SUMMARY OF THE INVENTION

A hydraulic brake apparatus for a vehicle includes a brake operating member, a reservoir, and a master cylinder for generating brake hydraulic pressure by increasing brake fluid pressure from the reservoir. A master piston is provided in the master cylinder and is movable in response to operation of the brake operating member. A closed chamber is defined by the master piston and a power piston is disposed behind the master piston. A power chamber is defined by the power piston and a rearward portion of the power piston. An auxiliary hydraulic pressure source serves for generating power hydraulic pressure by increasing the brake fluid pressure from the reservoir to a predetermined hydraulic pressure. A pressure regulating device is connected to the auxiliary hydraulic pressure source and to the reservoir, wherein the output power hydraulic pressure from the auxiliary hydraulic pressure source is regulated to a predetermined hydraulic pressure and fed into the power chamber. A reaction force member is disposed in a front end portion of the power piston and is exposed towards the closed chamber. A retaining member is disposed at either the master piston or the power piston, and maintains the reaction force member to be exposed to the closed chamber, wherein the reaction force of the master piston in a rearward direction is transmitted directly to a front end portion of the power piston while bypassing the reaction force member.

The retaining member can be in the form of an intermediate member disposed at the front end portion of the power piston and engageable with the rear end portion of the master piston, with a clearance being defined between the rear end portion of the master piston and the reaction force member when the intermediate member and the rear end portion of the master piston contact one another.

A collar portion can be provided at the rear end portion of the master piston. The collar portion is engageable with the front end portion of the power piston, with a clearance being defined between the rear end portion of the master piston and the reaction force member.

According to another embodiment of the invention, a hydraulic brake apparatus for a vehicle includes a brake operating member, a reservoir containing brake fluid, a master cylinder that generates a brake hydraulic pressure by increasing a pressure of the brake fluid from the reservoir, a master piston provided in the master cylinder and movable in response to operation of the brake operating member, a closed chamber defined at least in part by the master piston, a power piston disposed behind the master piston, a power chamber defined at least in part by the power piston at a rear portion of the power piston, and an auxiliary hydraulic pressure source that generates a power hydraulic pressure by increasing the brake fluid from the reservoir to a predetermined hydraulic pressure. A pressure regulating device is connected to the auxiliary hydraulic pressure source and the reservoir, and regulates the power hydraulic pressure output from the auxiliary hydraulic pressure source to a predetermined hydraulic pressure and feeds the regulated power hydraulic pressure to the power chamber. A reaction disc is disposed at a front end portion of the power piston between the power piston and the master piston, and faces towards the closed chamber. An intermediate member is disposed between the master piston and the power piston to maintain the reaction disc at a position exposed towards the closed chamber. The master piston directly transfers a rearwardly directed reaction force to the front end portion of the power piston while bypassing the reaction force member.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
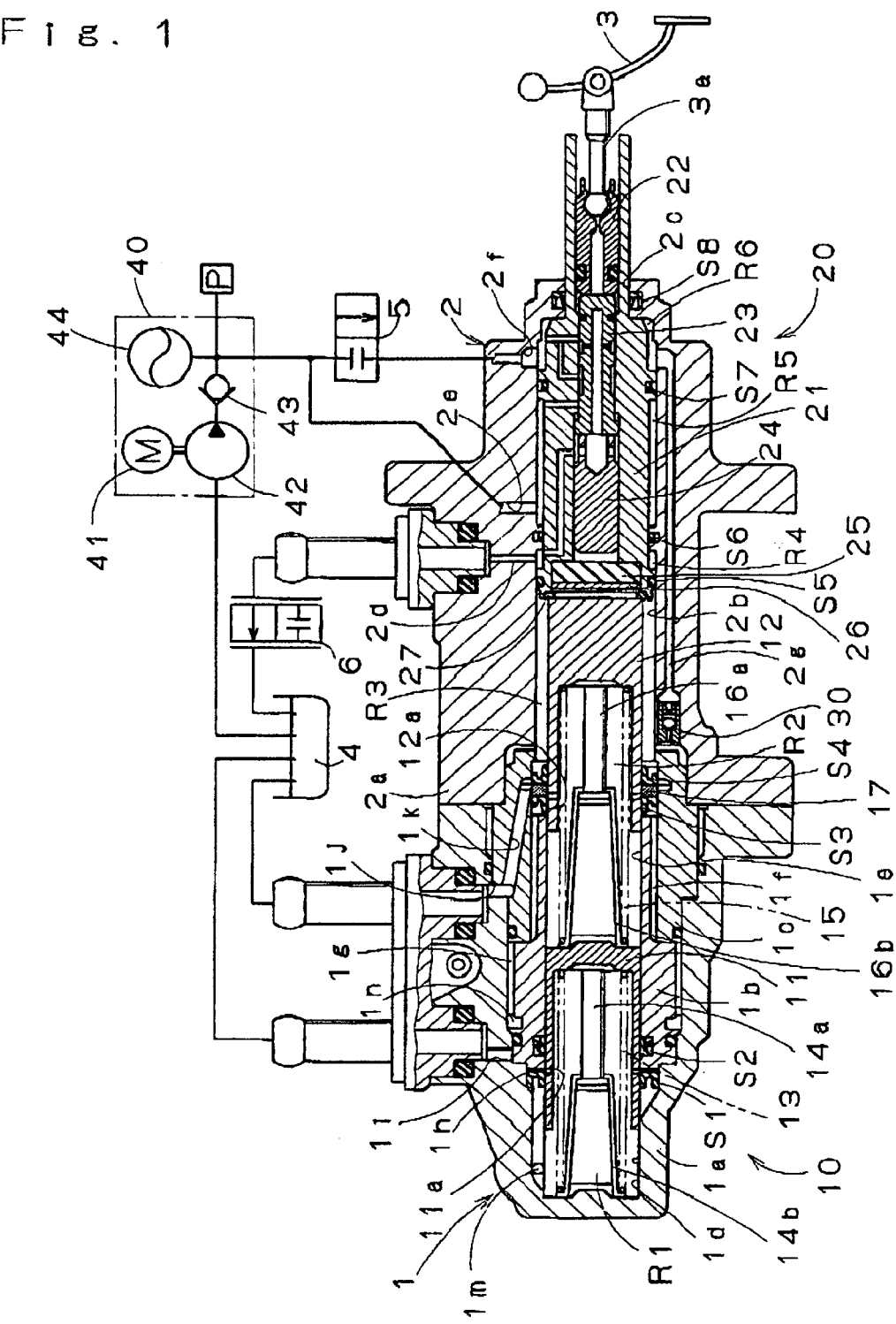
FIG. 1 is a cross-sectional view of a hydraulic brake apparatus according to a first embodiment of the present invention.
Figure 2:
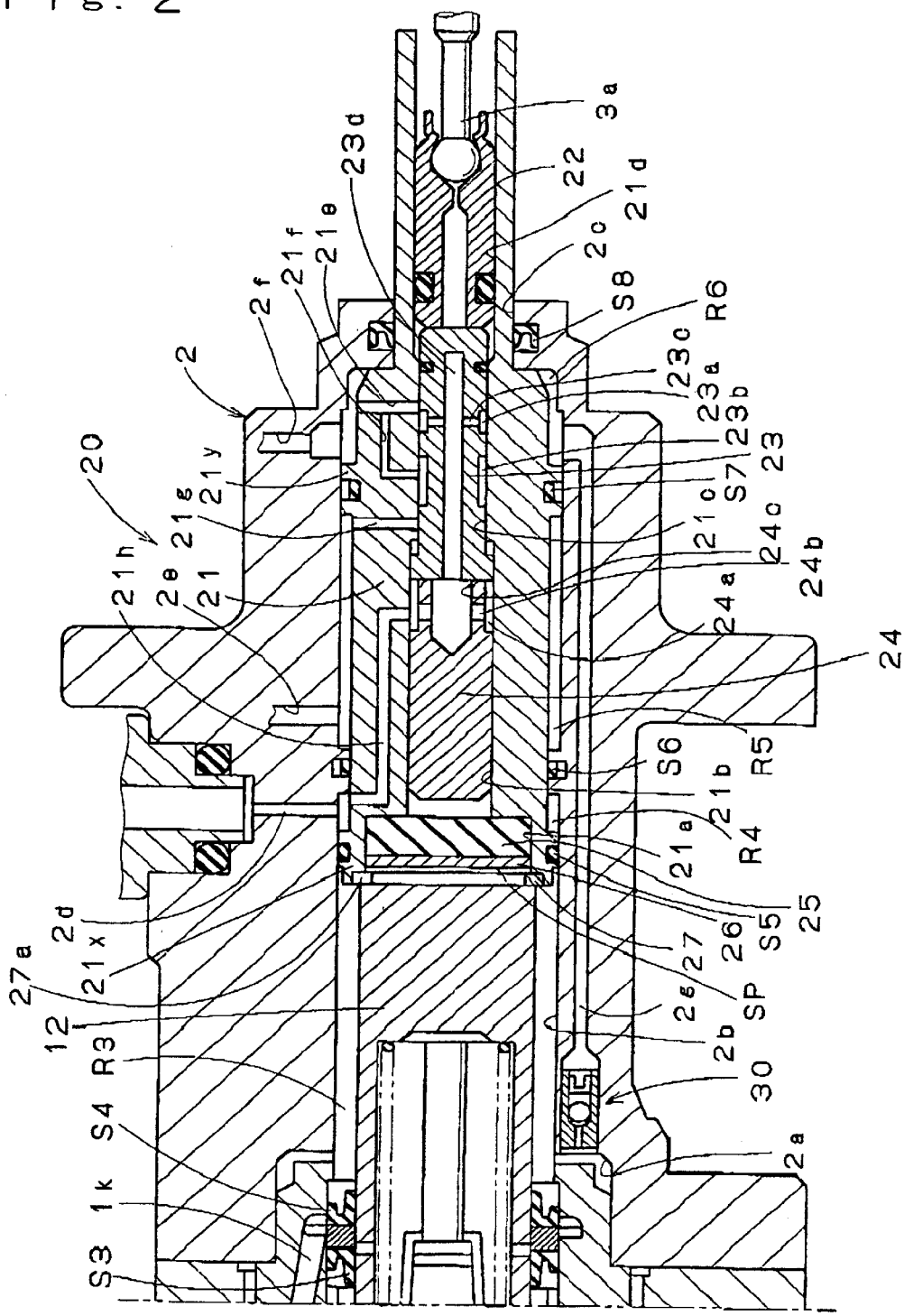
FIG. 2 is a slightly enlarged cross-sectional view of the hydraulic pressure booster used in the hydraulic brake apparatus when the brake operation is inactive.

Referring initially to FIGS. 1 and 2 which illustrate a hydraulic brake apparatus according to a first embodiment of the present invention, a depressing force applied to a brake pedal 3 is transmitted to an input rod 3a as a braking force. Corresponding to this braking force, hydraulic brake pressure is outputted from a master cylinder 10, assisted by a hydraulic pressure booster 20, and is supplied to wheel cylinders operatively associated with respective wheels of the vehicle. There is illustrated an entire structure of the hydraulic brake apparatus in FIG. 1, and an enlarged view of the hydraulic pressure booster 20 in FIG. 2.

As shown in FIG. 1, according to the first embodiment of the present invention, a master cylinder housing 1 of a cylinder body includes a first cylinder 1a, a second cylinder 1b and a third cylinder 1c. A master cylinder 10 is disposed in the master cylinder housing 1 and forms a tandem brake master cylinder in which a pair of master pistons 11, 12 is accommodated in series. The first cylinder 1a has a closed bottom portion at one end and is provided with stepped inner bore possessing an inner diameter that gradually increases in a step-wise manner from a cylinder bore 1d towards an opening portion of the first cylinder 1a. The cylinder bore 1d is defined between the first cylinder 1a and the master piston 11. A pair of fluid supply ports 1i, 1j and a pair of outlet ports 1m, 1n are defined in the first cylinder 1a.

The second cylinder 1b is positioned in the first cylinder 1a and possesses an approximately cylindrical shape in which is defined a cylinder bore 1e. The cylinder bore 1e has the same diameter as that of the cylinder bore 1d. A hydraulic passage 1h is formed in the front end portion of the second cylinder 1b and is connected to the fluid supply port 1i in the first cylinder 1a. An annular cup-shaped sealing member S1 is disposed ahead of or in front of the hydraulic passage 1h and opens in the forward direction (i.e., the left direction in FIG. 1). On the other hand, an annular cup-like sealing member S2 is disposed behind or rearwardly of the hydraulic passage 1h and opens in the rearward direction (i.e., the right direction in FIG. 1).

The third cylinder 1c is disposed behind the second cylinder 1b and receives the rear portion of the second cylinder 1b. An annular hydraulic passage 1f is defined between the second cylinder 1b and the third cylinder 1c, and communicates with an annular hydraulic passage 1g defined between the first cylinder 1a and the second cylinder 1b. The outlet port in opens to the hydraulic passage 1g. A hydraulic passage 1k is defined at a side surface of the third cylinder 1c and communicates with the fluid supply port 1j. An annular member 17 is disposed at an opening portion of the hydraulic passage 1k.

A sealing member S3 is disposed ahead of or in front of the annular member 17 and opens in the forward direction. Another sealing member S4 is disposed behind or rearward of the annular member 17 and opens in the rearward direction. The annular member 17 is disposed between the two sealing members S3, S4. The opening portion of the hydraulic passage 1f is arranged ahead of or in front of the sealing member S3 and the opening portion of the hydraulic passage 1k is arranged upward of the sealing member S4.

The master piston 11 having a closed bottom portion is accommodated in a fluid-tight and slidable manner in the cylinder bore 1*d*, and a first pressure chamber R1 is defined between the first cylinder 1*a* and the master piston 11. The master piston 12 is accommodated in the cylinder bore 1*e* and is supported in a fluid-tight and slidable manner by the annular member 17 and the two sealing members S3, S4. A second pressure chamber R2 is thus defined between the master pistons 11, 12.

At the rear end position of the master piston 11 under the non-operated condition, a communicating hole 11*a* formed on the skirt portion of the master piston 11 faces the hydraulic passage 11*h*, whereby the first pressure chamber R1 communicates with a reservoir 4 through the fluid supply port 1*i*. Likewise, at a rear end position of the master piston 12 under the non-operated condition, a communicating hole 12*a* formed on a skirt portion of the master piston 12 faces the sealing member S3, whereby the second pressure chamber R2 communicates with the reservoir 4 through the hydraulic passage 1*k* and the fluid supply port 1*j*. The sealing member S3 allows brake fluid to be fed from the hydraulic passage 1*k* to the pressure chamber R2 and blocks reverse brake fluid flow when the sealing member S3 is arranged at the aforementioned position in FIG. 1. The sealing member S4 allows brake fluid to be fed from the hydraulic passage 1*k* to a closed chamber R3 and blocks reverse brake hydraulic fluid flow.

A spring 13 extends between the front end surface of the first cylinder 1*a* and the recessed closed bottom surface of the master piston 11. The master piston 11 is thus biased in the rearward direction. One end of a push rod 14*a* is fixed to the recessed bottom surface of the master piston 11 and a tip portion at the other end of the push rod 14*a* is engaged with the end portion of a retainer 14*b*. Thus, rearward movement of the master piston 11 is restricted.

Another spring 15 extends between the rear end surface of the master piston 11 and the recessed closed bottom surface of the master piston 12. The master piston 11 is thus urged in the forward direction and the master piston 12 is biased in the rearward direction so that the two master pistons 11, 12 are always urged in opposite directions away from each other.

One end of a push rod 16*a* is fixed to the recessed closed bottom surface of the master piston 12 and a tip portion at the other end of the push rod 16*a* is engaged with the end portion of a retainer 16*b*. Rearward movement of the master piston 12 is thus restricted.

The hydraulic pressure booster 20 is accommodated behind the master piston 12 through the closed chamber R3. The first cylinder 1*a* of the master cylinder housing 1 is fixed to a fourth cylinder 2*a* forming a booster housing 2. The fourth cylinder 2*a* has a bottom or rear portion. A power piston 21 is positioned in a fluid-tight and slidable manner in a cylinder bore 2*b* of the fourth cylinder 2*a*. The cylinder bore 2*b* has a larger diameter than the diameters of the cylinder bores 1*d*, 1*e*.

As shown in FIG. 2, a land portion 21*x* is formed ahead of or in front of the power piston 21. A sealing member S5 is received in a groove in the land portion 21*x*. Another land portion 21*y* is formed behind or rearward of the power piston 21, and a sealing member S7 is received in a groove of the land portion 21*y*. A sealing member S6 is also disposed on the inner surface of the cylinder bore 2*b* between the sealing members S5, S7, while another sealing member S8 is disposed in a groove adjacent the opening portion 2*c* at the rear portion of the fourth cylinder 2*a*.

It is to be noted that although the power piston 21 is divided into two parts for disposing the sealing members S5, S6, S7 in the manner illustrated in FIG. 2, the power piston 21 is illustrated as a single member.

The closed chamber R3 is defined between the sealing members S4 and S5, an annular drain chamber R4 is defined between the sealing members S5 and S6, an annular fluid supply chamber R5 is defined between the sealing members S6 and S7, and a power chamber R6 is defined between the sealing members S7 and S8.

As shown in the slightly enlarged cross-sectional view of FIG. 2, defined within the power piston 21 are a recessed portion 21*a*, a large diameter cylinder bore 21*b*, a small diameter cylinder bore 21*c*, and a large diameter cylinder bore 21*d*. Also defined within the power piston 21 are a communicating hole 21*h* connecting the cylinder bore 21*b* to the drain chamber R4, a communicating hole 21*g* connecting the cylinder bore 21*c* to the fluid supply chamber R5, and communicating holes 21*e*, 21*f* connecting the cylinder bore 21*c* to the power chamber R6.

A plunger 22 is positioned in a fluid-tight and slidable manner in the cylinder bore 21*d* and is connected to the input rod 3*a* behind the plunger 22. A first spool 23 is accommodated in a fluid-tight and slidable manner in the cylinder bore 21*c* at a position ahead of or in front of the plunger 22. A second spool 24 is also accommodated in a fluid-tight and slidable manner in the cylinder bore 21*b* at a position ahead of or in front of the cylinder bore 21*c*. Alternatively, the first spool 23 can be formed with the second spool 24 as an integral unit. A rubber reaction force disc 25 forming a reaction force member is disposed in the recessed portion 21*a* as an elastic body for transmitting a reaction force. A metal plate 26 is firmly in contact with the reaction force disc 25 and is axially movable together with the reaction force disc. Under the non-operated condition shown in FIGS. 1 and 2, a slight clearance is defined between the reaction force disc 25 and the front end surface of the second spool 24. The desired jumping characteristics can be determined by adjusting the clearance.

An annular intermediate member 27 is positioned at the front end of the power piston 21. The reaction force can be transmitted between the master piston 12 and the power piston 21 via the annular portion of the intermediate member 27. As shown in FIG. 2, a notch 27*a* is partially defined in the intermediate member 27. When the rear end portion of the master piston 12 comes into contact with the annular portion of the intermediate member 27, a clearance SP is defined between the rear end portion of the master piston 12 and the metal plate 26. The clearance SP serves for connecting the closed chamber R3 with the notch 27*a*. The reaction force member is thus exposed to the closed chamber R3. As shown in FIG. 2, annular grooves 23*a*, 23*b* are defined on the outer periphery of the first spool 23. An axially extending hole 23*d* is defined on the outer periphery of the first spool 23 and opens in the forward direction. The hole 23*d* is connected to the annular groove 23*a* via a communicating hole 23*c* laterally defined in the first spool 23. Under the non-operated condition shown in FIG. 2, the annular grooves 23*a*, 23*b* face the opening portion of the respective communicating holes 21*e*, 21*f*, wherein the power chamber R6 is connected to the hole 23*d* via the communicating hole 21*e*, the annular groove 23*a* and the communicating hole 23*c*. Upon forward movement of the first spool 23, as shown FIG. 3, the communication between the power chamber R6 and the hole 23*d* is interrupted. In stead of the communication between the hole 23*d* and the power chamber R6 as shown in FIG. 2, the power chamber R6 is connected to the communicating hole 21*g* since the annular groove 23*b* faces each opening portion of the communicating holes 21*f* and 21*g*.

Figure 3:
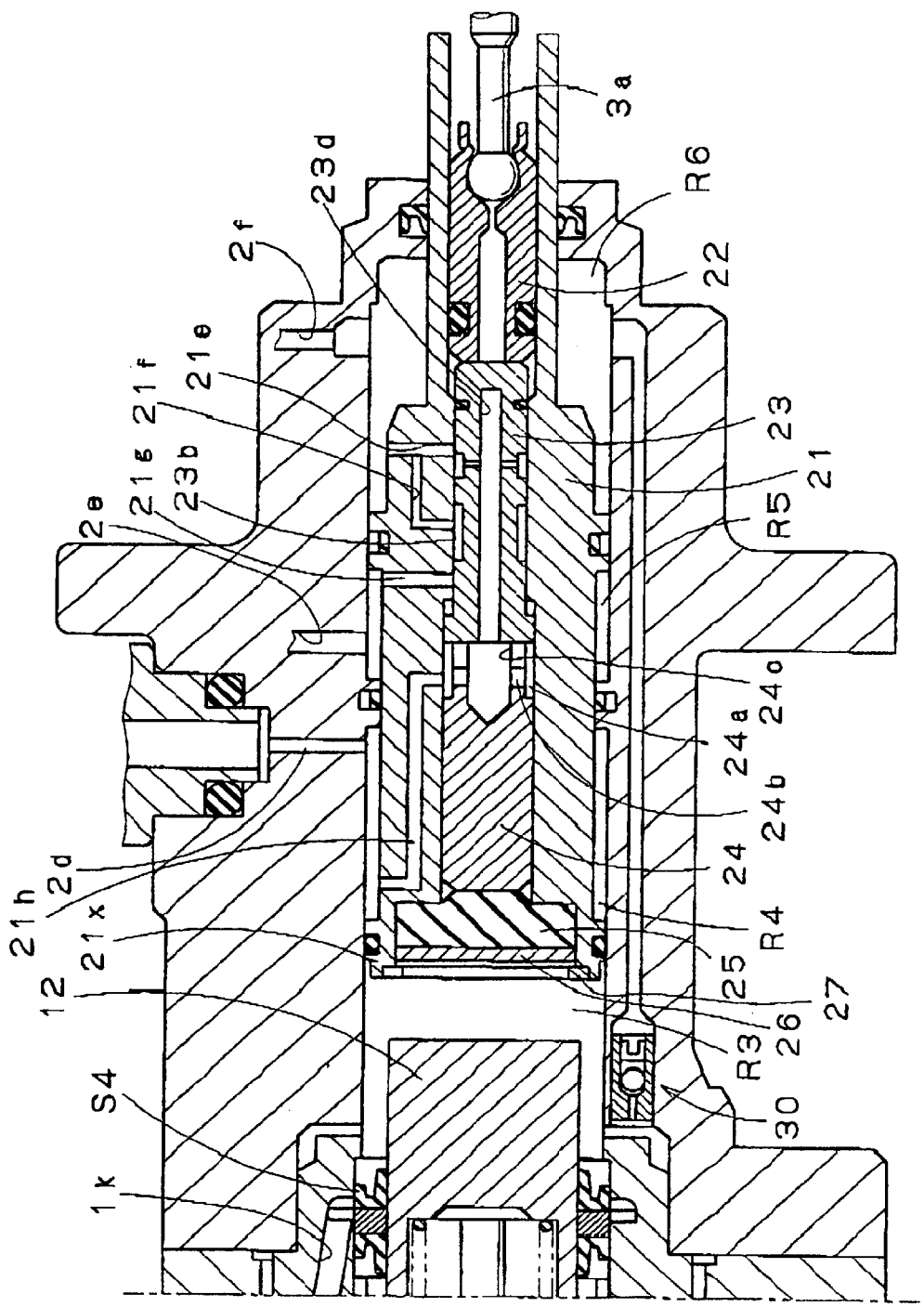
FIG. 3 is a slightly enlarged cross-sectional view of the hydraulic pressure booster when the brake operation is active.

An annular groove 24a is defined on the outer periphery of the second spool 24 in the rearward direction with respect to the second spool 24. An axially extending hole 24c is located in the spool 24 and faces the opening portion of the hole 23d in the first spool 23. The hole 24c is connected to the annular groove 24a via a communicating hole 24b that is laterally defined in the spool 24. The hole 24c is further connected to the drain chamber R4 via the communicating hole 21h. Additionally, according to the first embodiment of the present invention as shown in FIGS. 2 and 3, the first spool 23 and the second spool 24 are in contact with each other and move together as one unit. As described below, the two spools can be separated from one another with a space defined between the two spools.

Three ports are defined in the booster housing 2, including a drain port 2d always connected to the drain chamber R4, a fluid supply port 2e, and a fluid supply port 2f. As shown in FIG. 1, the drain port 2d is connected to the reservoir 4 through a normally-open type solenoid valve 6. The solenoid valve 6 is comprised of a proportioning valve to carry out fine brake control. The fluid supply ports 2e, 2f are connected to an auxiliary hydraulic pressure source 40 as shown in FIG. 1.

The auxiliary hydraulic pressure source 40 is provided with an electric motor 41 and a hydraulic pressure pump 42 driven by the motor 41. The input side of the hydraulic pressure pump 42 is connected to the reservoir 4 and the output side of the hydraulic pressure pump 42 is connected to an accumulator 44 through a check valve 43. The output side of the hydraulic pressure pump 42 is further connected to the fluid supply port 2e and is connected to the fluid supply port 2f through a normally-closed type solenoid valve 5. If the solenoid valve 5 is made as a proportioning valve as well as the solenoid valve 6, the solenoid valve 5 can effectively carry out a more fine brake control. A pressure sensor P is connected to the accumulator 44 to maintain the auxiliary hydraulic pressure source 40 at a predetermined output hydraulic pressure. As described above, the pressure regulating device of the present invention is disposed in the power piston 21.

A hydraulic passage or communicating space 2g is defined in the booster housing 2 and connects the closed chamber R3 to the power chamber R6. A pressure differential responsive check valve 30 (a check valve 30) is disposed in the hydraulic passage 2g. The check valve 30 normally establishes communication between the power chamber R6 and the closed chamber R3. The check valve 30 is operated for being closed in correspondence to the pressure differential between the power chamber R6 and the closed chamber R3. When the hydraulic pressure in the power chamber R6 is larger than that in the closed chamber R3 and when the pressure differential becomes equal to or greater than a predetermined value, the check valve 30 is operated to close, thus interrupting communication between the power chamber R6 and the closed chamber R3. On the other hand, during the non-operated condition, the check valve 30 is maintained in the open position because there is no pressure applied to the power chamber R6 and the closed chamber R3. Therefore, when the closed chamber R3 is required to be filled with brake fluid, an evacuation of the air in the closed chamber R3 can be carried out relatively easily and accurately by bleeding air from the power chamber R6.

The overall operation of the hydraulic brake apparatus constructed in the manner described above is as follows, referring to the various illustrations in FIGS. 1–7. An operated condition of the hydraulic pressure booster 20 of the hydraulic brake apparatus is illustrated in FIGS. 3–7.

FIGS. 1 and 2 show the position of the various components forming the hydraulic brake apparatus when the brake pedal 3 is in the non-operated condition. Under the non-operated condition, the solenoid valve 5 is in the closing position and the solenoid valve 6 is in the opening position. The hydraulic pressure booster 20 is also in the non-operated condition. The rear end surface of the master piston 12 is not in contact with (i.e., is spaced from) the metal plate 26. The closed chamber R3 is connected to the reservoir 4 through the check valve 30, the power chamber R6, the drain chamber R4 and the drain port 2d so as to be set at atmospheric pressure.

The fluid supply chamber R5 is connected to the accumulator 44 included in the auxiliary hydraulic pressure source 40. However, communication between the fluid supply chamber R5 and the power supply chamber R6 is interrupted by the first spool 23. That is, by virtue of the position of the first spool 23, communication of the communicating hole 21g and the groove 23b is prevented and so communication between the fluid supply chamber R5 and the power chamber R6 is not permitted.

The power chamber R6 is connected to the reservoir 4 through the communicating hole 21e, the groove 23a facing the hole 21e, the communicating hole 23c, the hole 23d of the first spool 23, the hole 24c of the second spoof 24, the communicating hole 24b, the groove 24a, the communicating hole 21h of the power piston 21 and the drain port 2d. The power chamber R6 is further connected to the closed chamber R3 via the hydraulic passage 2g and the check valve 30. Accordingly, when the auxiliary hydraulic pressure source 40 is active, the power piston 21 is applied only with a rearward force by the hydraulic pressure of the fluid supply chamber R5. Therefore, the power piston 21 can be maintained at the position shown in FIGS. 1 and 2.

Under brake pedal operation, the first spool 23 is pushed forward by the forward movement of the plunger 22 and is moved in a manner similar to that shown in FIG. 3. Corresponding to the forward movement of the first spool 23, communication between the communicating hole 21e and the groove 23a is interrupted, wherein communication between the power chamber R6 and the communicating hole 23d is interrupted. On the other hand, upon sufficient movement of the first spool 23, the annular groove 23b faces the opening portion of both communicating holes 21f, 21g. Therefore, power hydraulic pressure is fed into the power chamber R6 through the fluid supply port 2e, the communicating hole 21g, the annular groove 23b, and the communicating holes 21f, 21e. The power hydraulic pressure is also fed into the fluid supply chamber R5 from the auxiliary hydraulic pressure source 40. Accordingly, a pushing pressure received by the annular area of the land portion 21y (constituting a rearward pressure receiving surface) for biasing the power piston 21 in the rearward direction by the power hydraulic pressure of the fluid supply chamber R5, a pushing pressure received by the effective cross-sectional area of the power piston 21 by the power hydraulic pressure fed into the power chamber R6 corresponding to the brake pedal operation, and the brake pedal depressing force are balanced. Under the well-balanced condition of the three different pressures, when the pressure differential between the power chamber R6 and the closed chamber R3 becomes equal to or greater than the predetermined value, the hydraulic passage 2g is blocked, with the check valve 30 being at the closed position. The closed chamber R3 thus becomes a hydraulically sealed space with brake fluid fully filled in the closed chamber. In other words, the area of the land portion 21y constituting the rearward pressure receiving surface is set to be a predetermined size to maintain the pressure required for the forward movement of the power piston 21 to be at a sufficient pressure level for closing the check valve 30. Therefore, the closing operation of the check valve 30 is completed before a master cylinder hydraulic pressure is generated.

As mentioned above, while the hydraulic pressure booster 20 is in the operated condition after the closed chamber R3 becomes the sealed space, the pushing pressure applied to the annular area of the land portion 21y and the pushing pressure applied to the front end surface of the power piston 21 by the hydraulic pressure of the closed chamber R3 are controlled in the well-balanced manner relative to the brake pedal depressing force and the pushing pressure applied to the rear end surface of the power piston 21. Because the effective cross-sectional area of the land portion 21x of the power piston 21 is larger than that of the master piston 12, the master piston 12 moves forward corresponding to the forward movement of the power piston 21. Therefore, as shown in FIG. 3, the clearance between the master piston 12 and the power piston 21 is enlarged. The master piston 12 is hydraulically connected to the power piston 21 and can be moved as a unit. As described above, when the hydraulic pressure booster 20 is in the operated condition, the power piston 21 is hydraulically connected to the master piston 12 via the brake fluid filled in the closed chamber R3 and the two move together in the forward direction as a unit by the clearance defined between the pistons 21, 12. Therefore, the forward movement of the power piston 21 and the master piston 12 together as a unit can minimize the stroke of the brake pedal 3.

The brake fluid pressure is supplied from the master cylinder 10 which is urged with the assisting hydraulic pressure transmitted to the master piston 12 in response to the forward movement of the power piston 21. The reaction force is transmitted to the reaction force disc 25 via the brake fluid filled in the closed chamber R3 and the metal plate 26. Therefore, the reaction force disc 25 is compressed and deformed into the cylinder bore 21b. Accordingly, the second spool 24 is retracted in the rearward direction, wherein the reaction force is transmitted to the brake pedal 3 via the first spool 23, the plunger 22 and the input rod 3a.

On the other hand, should the hydraulic pressure booster 20 fail, the power hydraulic pressure is not fed into the fluid supply chamber R5 and the power chamber R6. The drain chamber R4 is connected to the reservoir 4 via the drain port 2d. The closed chamber R3 is connected to the reservoir 4 via the hydraulic passage 1k and the fluid supply port 1j. Therefore, the closed chamber R3 and the chambers R4, R5, R6 are maintained at atmospheric pressure. Accordingly, corresponding to the forward movement of the input rod 3a by the operation of the brake pedal 3, the second spool 24 is moved forward via the plunger 22 and the first spool 23, and contacts the reaction force disc 25. The master piston 12 is pressured or moved forward via the reaction force disc 25, the metal plate 26 and the intermediate member 27 and is moved forward integrally as shown in FIG. 4.

Figure 4:
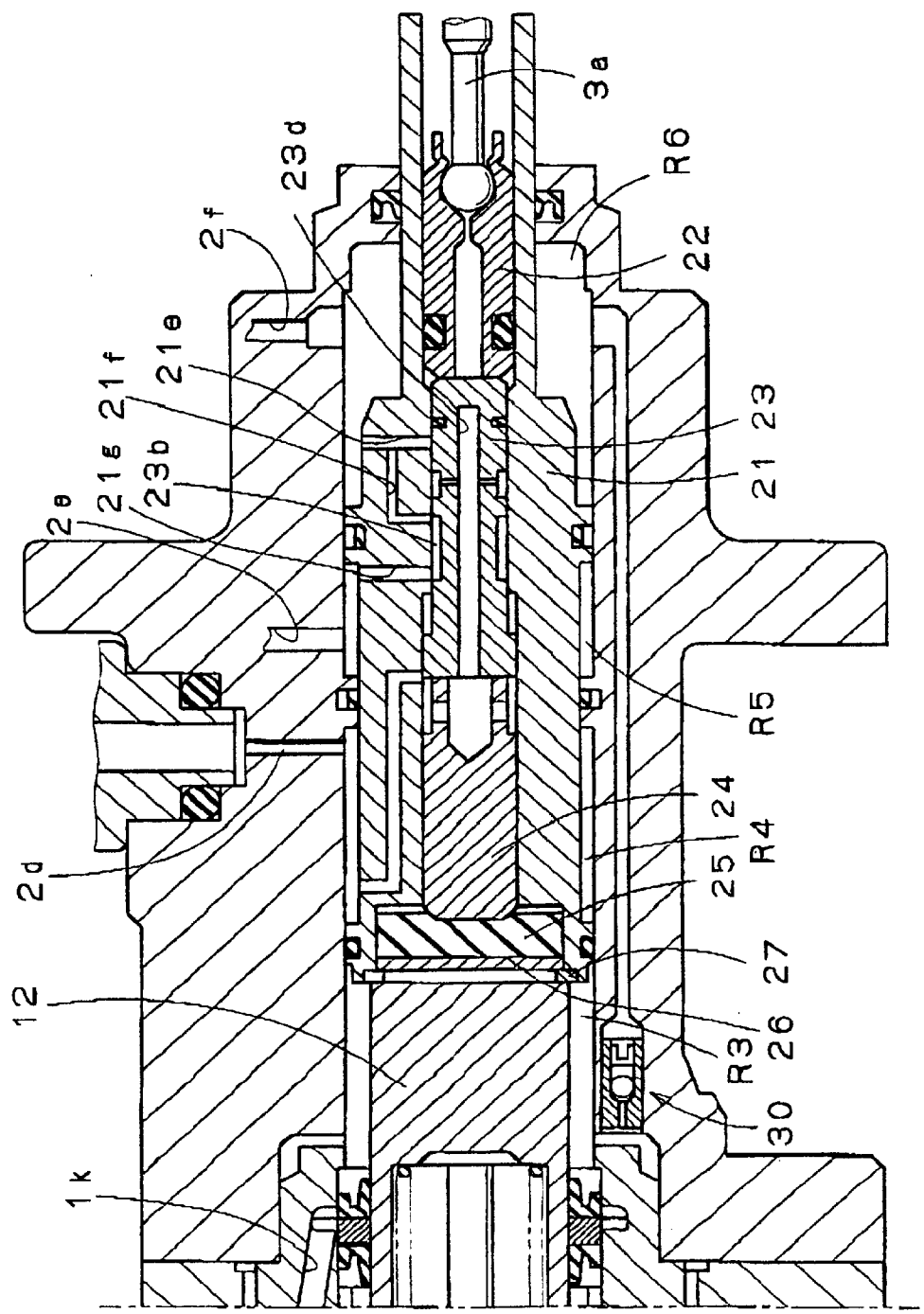
FIG. 4 is a slightly enlarged cross-sectional view of the hydraulic pressure booster upon failure.

Under the above condition as shown in FIG. 4, the brake hydraulic pressure is generated by the forward integral movement of the power piston 21 and the master piston 12. The generated brake hydraulic pressure is determined not by the effective cross-sectional area of the land portion 21x of the power piston 21, but by the effective cross-sectional area of the master piston 12. Therefore, should the hydraulic pressure booster 20 fail, a hydraulic pressure increase gradient is increased compared with the hydraulic pressure increase gradient estimated under the effective cross-sectional area of the land portion 21x being equal to that of the master piston 12. Because the closed chamber R3 is at atmospheric pressure (being equal to or less than a predetermined pressure), the reaction force of the master piston 12 for the rearward movement is directly transmitted to the front end portion of the power piston 21 directly bypassing the reaction force disc 25.

Figure 7:
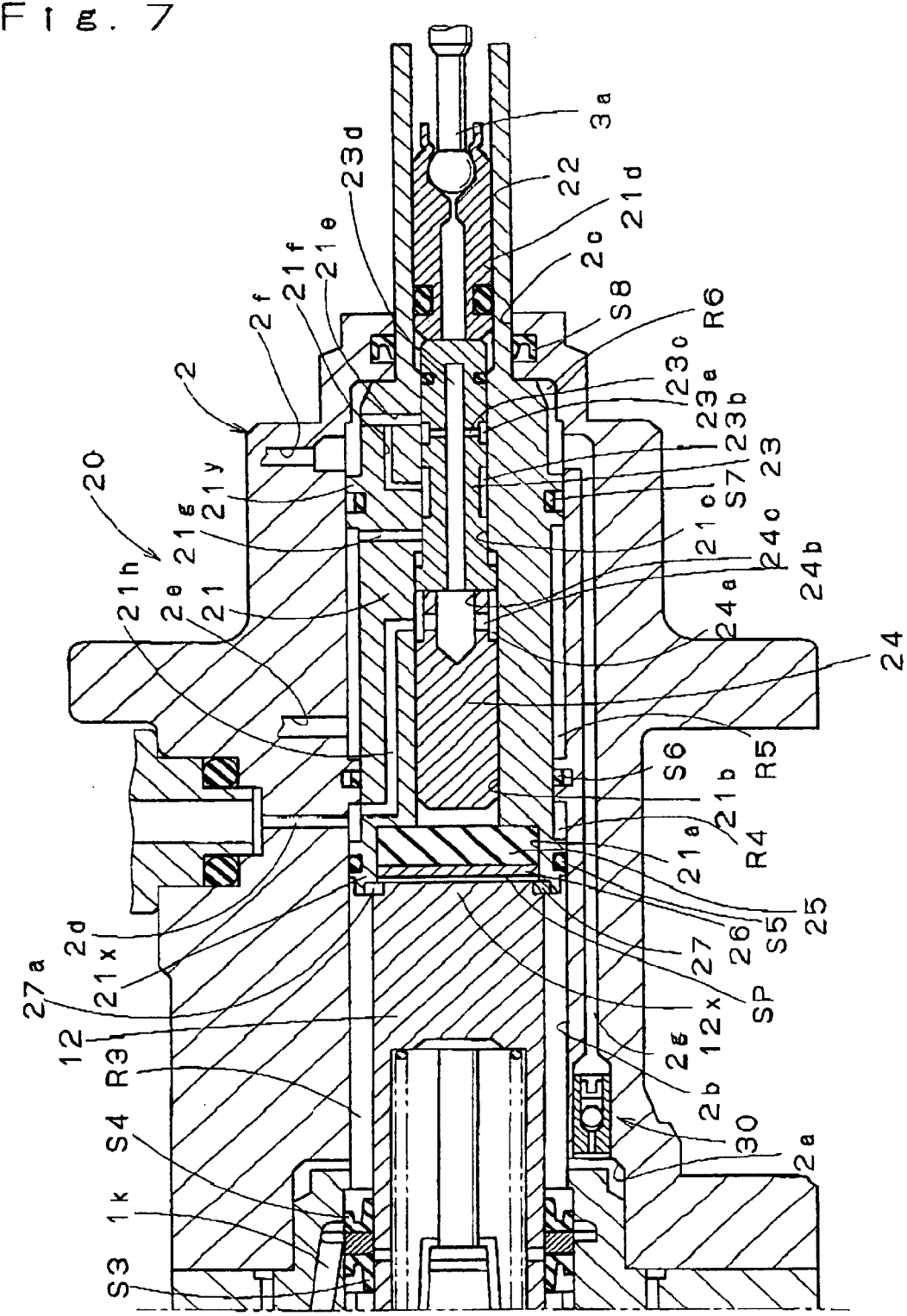
FIG. 7 is a slightly enlarged cross-sectional view of the hydraulic pressure booster according to a second embodiment of the present invention when the brake operation is inactive.
Figure 8:
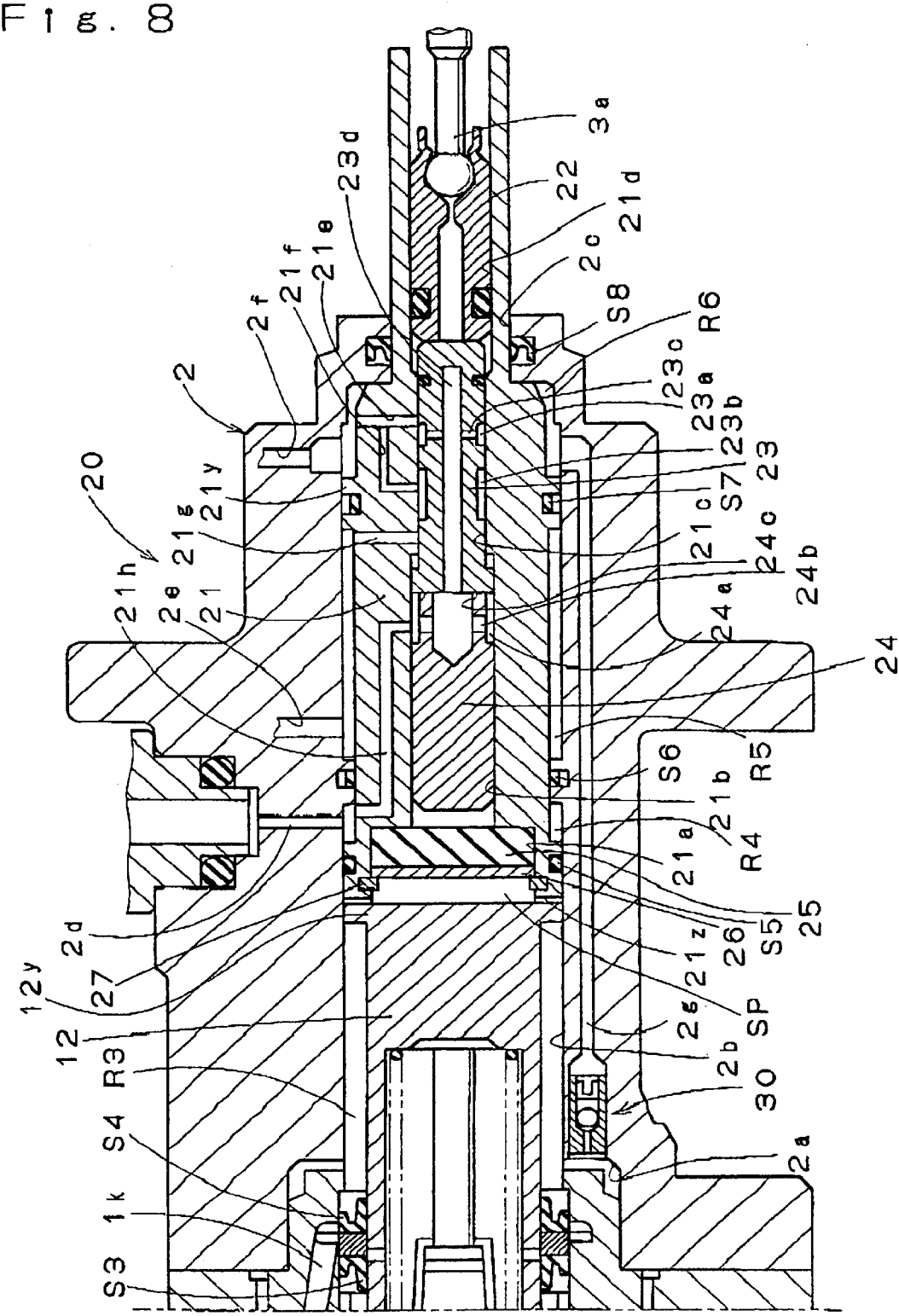
FIG. 8 is a slightly enlarged cross-sectional view of the hydraulic pressure booster according to a third embodiment of the present invention when the brake operation is inactive

Should the hydraulic pressure booster 20 fail, the reaction force disc 25 is applied with the pushing pressure of the second spool 24 in the forward direction. The pushing pressure is transmitted to the rear end portion of the master piston 12 via the metal plate 26 and the intermediate member 27. Because the hydraulic pressure booster 20 does not fail frequently, the durability of the reaction force disc 25 is not of significant concern. However, the reaction force disc 25 can be formed to achieve sufficient durability against the reaction force transmitted between the reaction force disc 25 and the rear end portion of the master piston 12 when the hydraulic pressure booster 20 is in the non-operated condition, which structure is shown in FIGS. 7 or 8, the details of which will be described in more detail below.

Figure 5:
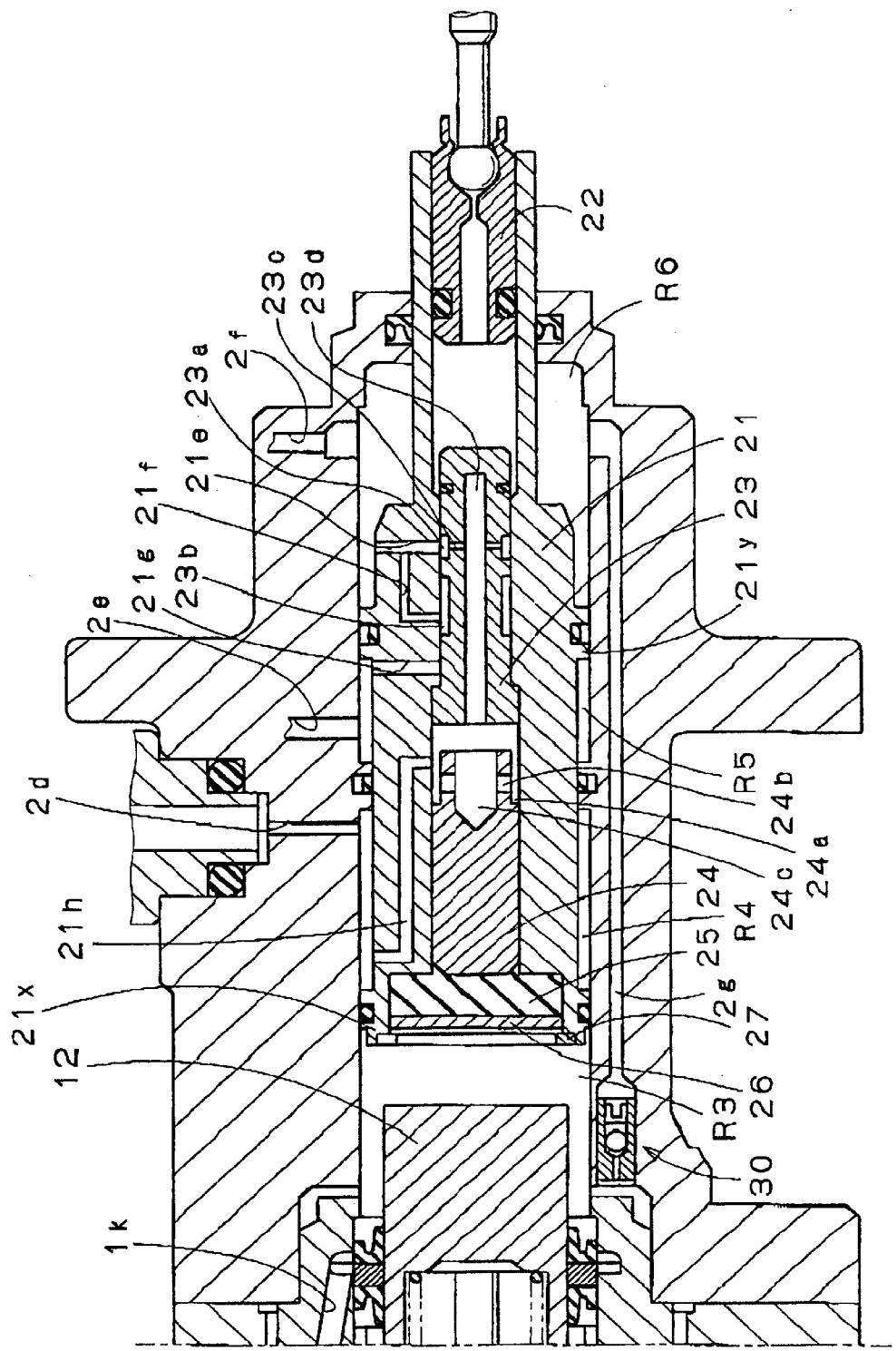
FIG. 5 is a slightly enlarged cross-sectional view of the hydraulic pressure booster when an automatic brake operation is carried out.

FIG. 5 illustrates the condition during active brake operation (i.e., an automatic brake operation). When the brake pedal 3 is under the non-operated condition, the auxiliary hydraulic pressure source 40 is activated with the solenoid valve 5 (shown in FIG. 1) being in the open position and the solenoid valve 6 (shown in FIG. 1) being in the closed position. The position of the fist spool 23 and the second spool 24 at an initial state is the same as that shown in FIG. 2. The fluid supply chamber R5 is fed with the output power hydraulic pressure of the auxiliary hydraulic pressure source 40, with the communicating hole 21g being blocked by the first spool 23. Meanwhile, the power chamber R6 is connected to the drain port 2d via the communicating hole 21e, the groove 23a facing the communicating hole 21e, the communicating hole 23c, the hole 23d of the first spool 23, the hole 24c of the second spool 24, the communicating hole 24b, the groove 24a and the communicating hole 21h of the power piston 21. However, the power chamber R6 can be filled with brake hydraulic pressure with the check valve 6 being at the closed position. The power chamber R6 is thus filled with power hydraulic pressure. Accordingly, the first spool 23 is maintained at the position shown in FIG. 5, with the hydraulic pressure being applied to the front end of the first spool 23. The second spool 24 is moved forward by virtue of being pushed by the power hydraulic pressure, wherein the forward moving force of the second spool 24 is applied to the reaction force disc 25. Therefore, there is a clearance defined between the first spool 23 and the second spool 24 as shown in FIG. 5.

Under the above condition, the hydraulic passage 2g is blocked by the check valve 30 by virtue of the check valve 30 being in the closed position as a result of the pressure differential between the power chamber R6 and the closed chamber R3. When the hydraulic pressure in the closed chamber R3 is increased, the closed chamber R3 becomes a sealed space filled with brake fluid. Accordingly, the forward movement of the two master pistons 11, 12 is urged by the pushing pressure which is applied to the effective cross-sectional area of the power piston 21 corresponding to the brake hydraulic pressure fed into the power chamber R6. As described above, when the brake pedal 3 is in the non-operated condition, a desired brake hydraulic pressure can be outputted by controlling the auxiliary hydraulic pressure source 40 and the solenoid valves 5, 6 in response to the condition.

Figure 6:
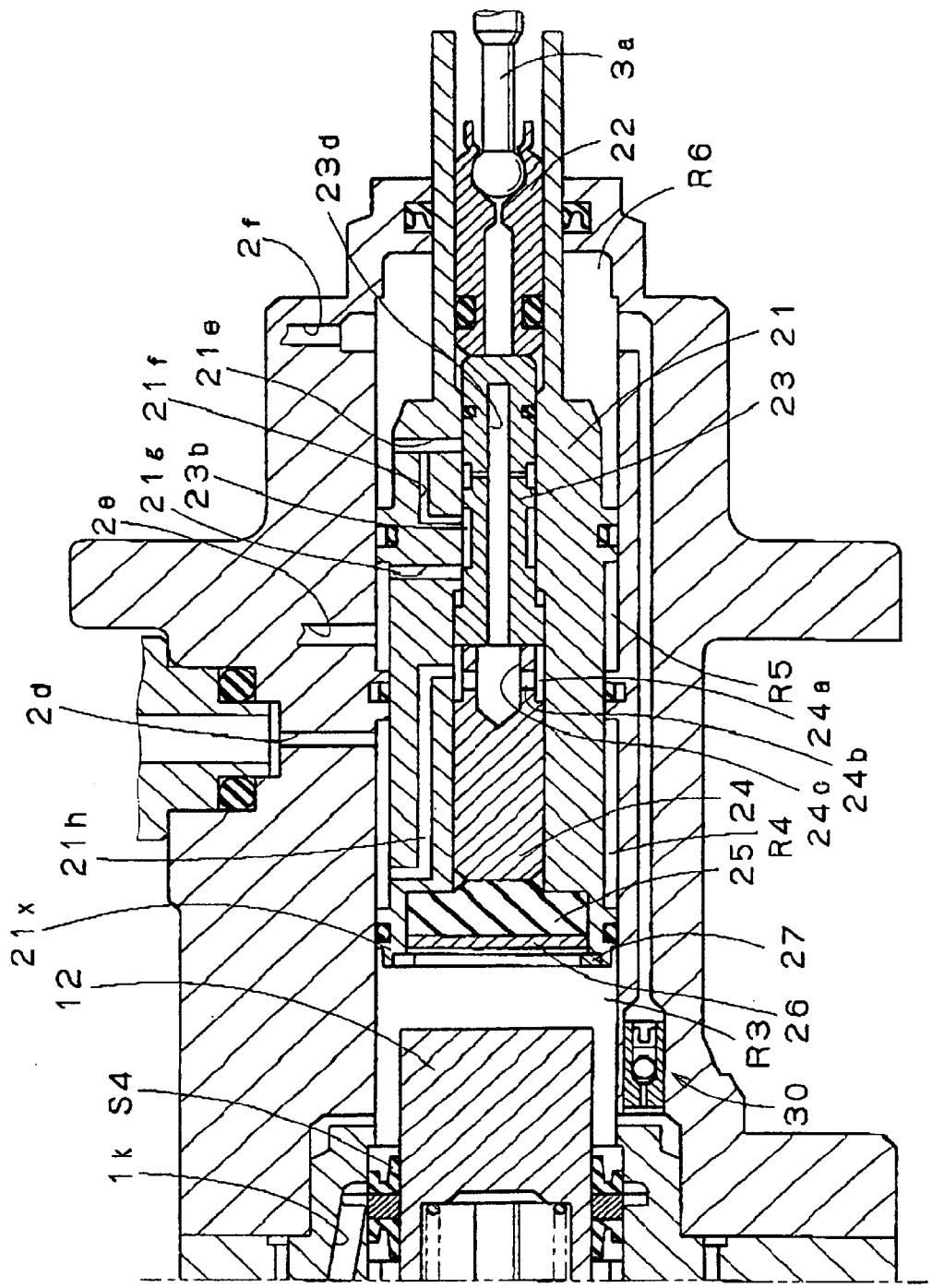
FIG. 6 is a slightly enlarged cross-sectional view of the hydraulic pressure booster when the brake assisting operation is carried out.

FIG. 6 shows the operating condition when brake assisting is in the operated condition. When the brake pedal is operated, the first spool 23 is moved forward by being urged by the forward movement of the plunger 29 and is set to be at the same position shown in FIG. 3. Although communication between the power chamber R6 and the hole 23d is interrupted, the power hydraulic pressure is fed into the power chamber R6 via the fluid supply port 2e, the communicating hole 21g, the annular groove 23b, and the communicating holes 21e, 21f which each have their opening portion facing the annular groove 23b. A detailed explanation of the operation under the above condition is not repeated here for purposes of simplifying the description because the operation is the same as that shown in FIG. 3.

Because the effective cross-sectional area of the land portion 21x is larger than that of the master piston 12, the forward movement of the master piston 12 is carried out corresponding to the forward movement of the power piston 21, wherein the clearance between the master piston 12 and the power piston 21 is expanded as shown in FIG. 6. Therefore, the master piston 12 is hydraulically connected to the power piston 21 and the two are moved together as the unit. As described above, the power piston 21 can be hydraulically connected to the master piston 12 via the brake fluid filled in the closed chamber R3. The master piston 12 can be moved forward as a unit with the power piston 21. The brake hydraulic pressure is generated corresponding to the forward movement of the master pistons 11, 12. Under the above condition, the brake hydraulic pressure in the closed chamber R3 is transmitted to the brake pedal 3 via the metal plate 26 and the reaction force disc 25, wherein the reaction force is applied to the brake pedal 3.

Under the above condition, when the brake pedal 3 is operated at a speed which is equal to or greater than a predetermined speed, or when the brake pedal 3 is operated at an operating amount which is equal to or greater than a predetermined value, the solenoid valve 5 is controlled for opening and closing after the solenoid valve 6 (shown in FIG. 1) is set to be at the closed position. Accordingly, the output power hydraulic pressure of the auxiliary hydraulic pressure source 40 is fed into the fluid supply chamber RS and the power chamber R6. Corresponding to the opening-closing operation of the solenoid valve 5, relative movement of the first spool 23 and the power piston 21 occurs. Accordingly, the brake hydraulic pressure generated under the above condition is equal to or greater than the hydraulic pressure generated when the normal brake assisting is carried out. Therefore, a proper braking force can be assured even when the depressing force applied to the brake pedal 3 is not sufficiently carried out.

A hydraulic pressure booster 20 according to a second embodiment of the present invention is illustrated in FIG. 7. In this embodiment, when the brake operating force is transmitted to the rear end portion of the master piston 12 via the reaction force disc 25 and the metal plate 26 when the hydraulic pressure booster 20 is in the non-operated condition, the rear end portion of the master piston 12 is adapted to contact the metal plate 26. A hollow portion of the intermediate member 27 receives a projecting portion 12x of the master piston 12. Therefore, should the hydraulic pressure booster 20 fail, the metal plate 26, the projection portion 12x of the master piston 12 and an inner portion of the intermediate member 27 come into contact with each other. Additionally, when the rear end portion of the master piston 12 is contacted with the front end portion of the power piston 21 under the normal braking operation, communication between the clearance SP and the closed chamber R3 is established via the notch 27a of the intermediate member 27.

The hydraulic pressure booster 20 according to a third embodiment of the present invention is illustrated in FIG. 8. In this embodiment, a radially outwardly extending collar portion 12y is formed at the rear end portion of the master piston 12. A notch 21z is defined at the front end peripheral portion of the power piston 21. The intermediate member 27 is positioned to restrict or retain the front end position of the metal plate 26. Therefore, communication between the clearance SP and the closed chamber R3 is established via the notch 21z when the collar 12y of the master piston 12 comes in contact with the front end portion of the power piston 21.

The hydraulic brake apparatus according to the present invention is able to minimize the stroke of the brake pedal 3 when the hydraulic pressure booster 20 is in the operated condition. Even in the event the hydraulic pressure booster 20 fails, a large hydraulic pressure can be generated so that a desired braking force can be applied to the wheel cylinders operatively associated with wheel of the vehicle. The reaction force can be transmitted to the reaction force disc 25 via the brake hydraulic pressure in the closed chamber R3 and the metal plate 26. Should the hydraulic pressure booster 20 fail, the reaction force can be transmitted to the power piston 21 directly rather than via the reaction force disc 25. Therefore, the durability of the reaction force disc 25 is increased. It is to be understood that in the present invention, the hydraulic pressure booster 20 can be configured as various kinds of boosters, such a hydraulic pressure booster and a regulator.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A hydraulic brake apparatus for a vehicle comprising:

a brake operating member;

a reservoir;

a master cylinder for generating a brake hydraulic pressure by increasing a pressure of brake fluid from the reservoir;

a master piston provided in the master cylinder and movable in response to operation of the brake operating member;

a power piston disposed behind the master piston;

a closed chamber defined between the master piston and the power piston;

a power chamber defined by the power piston and behind the power piston;

an auxiliary hydraulic pressure source for generating a power hydraulic pressure by increasing the brake fluid from the reservoir to a predetermined hydraulic pressure;

a pressure regulating device connected to the auxiliary hydraulic pressure source and to the reservoir, with the power hydraulic pressure output from the auxiliary hydraulic pressure source being regulated to a predetermined hydraulic pressure and fed to the power chamber;

a reaction force member disposed at a front end portion of the power piston and exposed towards the closed chamber;

a retaining device disposed to maintain the reaction force member exposed towards the closed chamber, with a reaction force of the master piston in a rearward direction being transmitted directly to the front end portion of the power piston while bypassing the reaction force member when the hydraulic pressure in the closed chamber becomes less than a predetermined hydraulic pressure.

2. The hydraulic brake apparatus for a vehicle according to claim 1, wherein the retaining device includes an intermediate member provided at the front end portion of the power piston and engageable with a rear end portion of the master piston to define a clearance between the rear end portion of the master piston and the reaction force member when the intermediate member and the rear end portion of the master piston contact one another.

3. The hydraulic brake apparatus for a vehicle according to claim 1, wherein a rear end portion of the master piston is provided with a collar portion that is engageable with the front end portion of the power piston while defining a clearance between the rear end portion of the master piston and the reaction force member.

4. The hydraulic brake apparatus for a vehicle according to claim 1, including a metal plate attached to a surface of the reaction force member that is exposed towards the closed chamber.

5. The hydraulic brake apparatus for a vehicle according to claim 1, wherein the pressure regulating device is formed in the power piston and is separated from the reaction force member by a predetermined clearance.

6. The hydraulic brake apparatus for a vehicle according to claim 1, wherein the retaining member includes an intermediate member provided at the front end portion of the power piston and engageable with a rear end portion of the master piston to define a clearance between the rear end portion of the master piston and the reaction force member when the intermediate member and the rear end portion of the master piston contact one another, the master piston including a projecting portion that extends into a hollow portion of the intermediate member.

7. A hydraulic brake apparatus for a vehicle comprising:

a brake operating member;

a reservoir containing brake fluid;

a master cylinder that generates a brake hydraulic pressure by increasing a pressure of the brake fluid from the reservoir;

a master piston provided in the master cylinder and movable in response to operation of the brake operating member;

a closed chamber defined at least in part by the master piston;

a power piston disposed behind the master piston;

a power chamber defined at least in part by the power piston at a rear portion of the power piston;

an auxiliary hydraulic pressure source that generates a power hydraulic pressure by increasing the brake fluid from the reservoir to a predetermined hydraulic pressure;

a pressure regulating device connected to the auxiliary hydraulic pressure source and the reservoir, and that regulates the power hydraulic pressure output from the auxiliary hydraulic pressure source to a predetermined hydraulic pressure and feeds the regulated power hydraulic pressure to the power chamber;

a reaction disc disposed at a front end portion of the power piston between the power piston and the master piston, and facing towards the closed chamber;

an intermediate member disposed between the master piston and the power piston to maintain the reaction disc at a position exposed towards the closed chamber; and the master piston directly transferring a rearwardly directed reaction force to the front end portion of the power piston while bypassing the reaction force member.

8. The hydraulic brake apparatus for a vehicle according to claim 7, wherein the intermediate member is provided at the front end portion of the power piston and is engageable with the rear end portion of the master piston to define a clearance between the rear end portion of the master piston and the reaction disc when the intermediate member and the rear end portion of the master piston engage one another.

9. The hydraulic brake apparatus for a vehicle according to claim 7, wherein a rear end portion of the master piston is provided with a collar portion that is engageable with the front end portion of the power piston while defining a clearance between the rear end portion of the master piston and the reaction disc.

10. The hydraulic brake apparatus for a vehicle according to claim 7, including a metal plate positioned adjacent a surface of the reaction disc that is exposed towards the closed chamber.

11. The hydraulic brake apparatus for a vehicle according to claim 7, wherein the pressure regulating device is formed in the power piston and is separated from the reaction disc by a predetermined clearance.

12. The hydraulic brake apparatus for a vehicle according to claim 7, wherein the master piston includes a projecting portion that extends into a hollow portion of the intermediate member.

13. The hydraulic brake apparatus for a vehicle according to claim 7, wherein the master piston directly transfers the rearwardly directed reaction force to the front end portion of the power piston while bypassing the reaction disc when the hydraulic pressure in the closed chamber becomes less than a predetermined hydraulic pressure.

* * * * *